United States Patent
Chin (10) Patent No.: US 12,202,569 B2
(45) Date of Patent: Jan. 21, 2025

(54) VIBRATION ABSORBING HANDLEBAR OF BICYCLE

(71) Applicant: T. K. CHIN COMPANY LTD., Taipei (TW)

(72) Inventor: Taan-Kuan Chin, Taipei (TW)

(73) Assignee: T. K. CHIN COMPANY LTD., Taipei (TW)

( * ) Notice: Subject to any disclaimer, the term of this patent is extended or adjusted under 35 U.S.C. 154(b) by 313 days.

(21) Appl. No.: 17/971,835

(22) Filed: Oct. 24, 2022

(65) Prior Publication Data

US 2023/0159132 A1 May 25, 2023

(30) Foreign Application Priority Data

Nov. 22, 2021 (TW) .................................. 110143389

(51) Int. Cl.
*B62K 21/14* (2006.01)
*B62K 21/16* (2006.01)

(52) U.S. Cl.
CPC ............ *B62K 21/145* (2013.01); *B62K 21/16* (2013.01)

(58) Field of Classification Search
CPC ............................... B62K 21/145; B62K 21/14
See application file for complete search history.

(56) References Cited

U.S. PATENT DOCUMENTS

| | | | | |
|---|---|---|---|---|
| 5,140,867 A * | 8/1992 | Smith | ................... | B62K 21/14 74/551.2 |
| 7,146,877 B2 * | 12/2006 | You | ....................... | B62K 21/14 74/551.2 |
| 8,029,011 B2 * | 10/2011 | King | ..................... | B62K 21/16 74/551.8 |
| 10,189,530 B2 * | 1/2019 | Galstad | .................. | B62K 21/26 |
| D948,644 S | 4/2022 | Chin | | |
| D948,645 S | 4/2022 | Chin | | |
| D1,002,760 S * | 10/2023 | Xie | .............................. | D21/692 |
| 2016/0114853 A1 | 4/2016 | Galstad et al. | | |
| 2021/0008400 A1 * | 1/2021 | Chin | ................ | A63B 23/03533 |

FOREIGN PATENT DOCUMENTS

| | | |
|---|---|---|
| CN | 2156116 Y | 2/1994 |
| CN | 103387032 A | 11/2013 |
| CN | 103395464 A | 11/2013 |
| CN | 204659937 U | 9/2015 |
| TW | 201006720 A | 2/2010 |
| TW | I696478 B | 6/2020 |
| TW | M624515 U | 3/2022 |

* cited by examiner

*Primary Examiner* — Kevin Hurley
*Assistant Examiner* — Hosam Shabara
(74) *Attorney, Agent, or Firm* — Best & Flanagan LLP (57) ABSTRACT

A vibration absorbing handlebar of a bicycle has a steering module, a left handle, and a right handle. The steering module has a stem. The left handle has a bar, and a first elastic component having two ends. One of the two ends of the first elastic component is connected with an end of the bar, and the other one of the two ends of the first elastic component is connected with the stem. The right handle has a bar, and a second elastic component having two ends. One of the two ends of the second elastic component is connected with an end of the bar, and the other one of the two ends of the second elastic component is connected with the stem.

6 Claims, 10 Drawing Sheets

VIBRATION ABSORBING HANDLEBAR OF BICYCLE

BACKGROUND OF THE INVENTION

1. Field of the Invention

The present invention relates to a bicycle handlebar, and more particularly to a vibration absorbing handlebar which is mounted on a steering system.

2. Description of Related Art

A conventional bicycle has a front wheel and a rear wheel respectively installed on a front side and a rear side of a frame of the conventional bicycle. The frame further has a pair of pedals pivotally connected thereto. By stepping on the pair of pedals, a sprocket is driven and drives the rear wheel to rotate via a chain. Furthermore, a steering module is disposed at the front side of the frame and includes a headset which is connected to a stem and a front fork. The stem is connected with a handlebar, and the front fork is connected with the front wheel. Thereby, when the handlebar swings, the front wheel may change its direction because the front fork as well as the stem are swung by the handlebar.

To facilitate a user to hold the handlebar and steer the front wheel, the handlebar is usually made of a hard material such as a steel tube. That is, a middle portion of the hard steel tube is fixed with the stem, and two ends of the steel tube may be bended to form specific shapes in favor of the user's holding. As the ground is normally bumpy, the conventional bicycle vibrates during a ride on such ground. After transmitted by the wheels, the frame, the steering module, and the handlebar, vibrations eventually reach the user's hands and body, making the user feel uncomfortable. Especially when the user rides for a long distance or time, discomforts become more obvious.

SUMMARY OF THE INVENTION

The main objective of the present invention is to provide a vibration absorbing handlebar of a bicycle having elastic components thereon that are capable of absorbing most vibrations. As a result, a user may feel more comfortable when taking a ride. Also, the vibration absorbing handlebar provides the user to exercise under suitable situations.

The vibration absorbing handlebar of a bicycle has a steering module, a left handle, and a right handle. The steering module has a stem. The left handle has a bar, and a first elastic component having two ends. One of the two ends of the first elastic component is connected with an end of the bar, and the other one of the two ends of the first elastic component is connected with the stem. The right handle has a bar, and a second elastic component having two ends. One of the two ends of the second elastic component is connected with an end of the bar, and the other one of the two ends of the second elastic component is connected with the stem.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 4, the present invention is a vibration absorbing handlebar of a bicycle, wherein the vibration absorbing handlebar is installed at a front side of a frame of a bicycle, i.e. a stem of the frame is connected with a middle portion of the vibration absorbing handlebar. The vibration absorbing handlebar includes elastic components located between the middle portion and two ends of the vibration absorbing handlebar. Specifically, in an embodiment, the vibration absorbing handlebar comprises a steering module 10, a left handle 20, a right handle 30, and a fixing knob 40.

Figure 1:
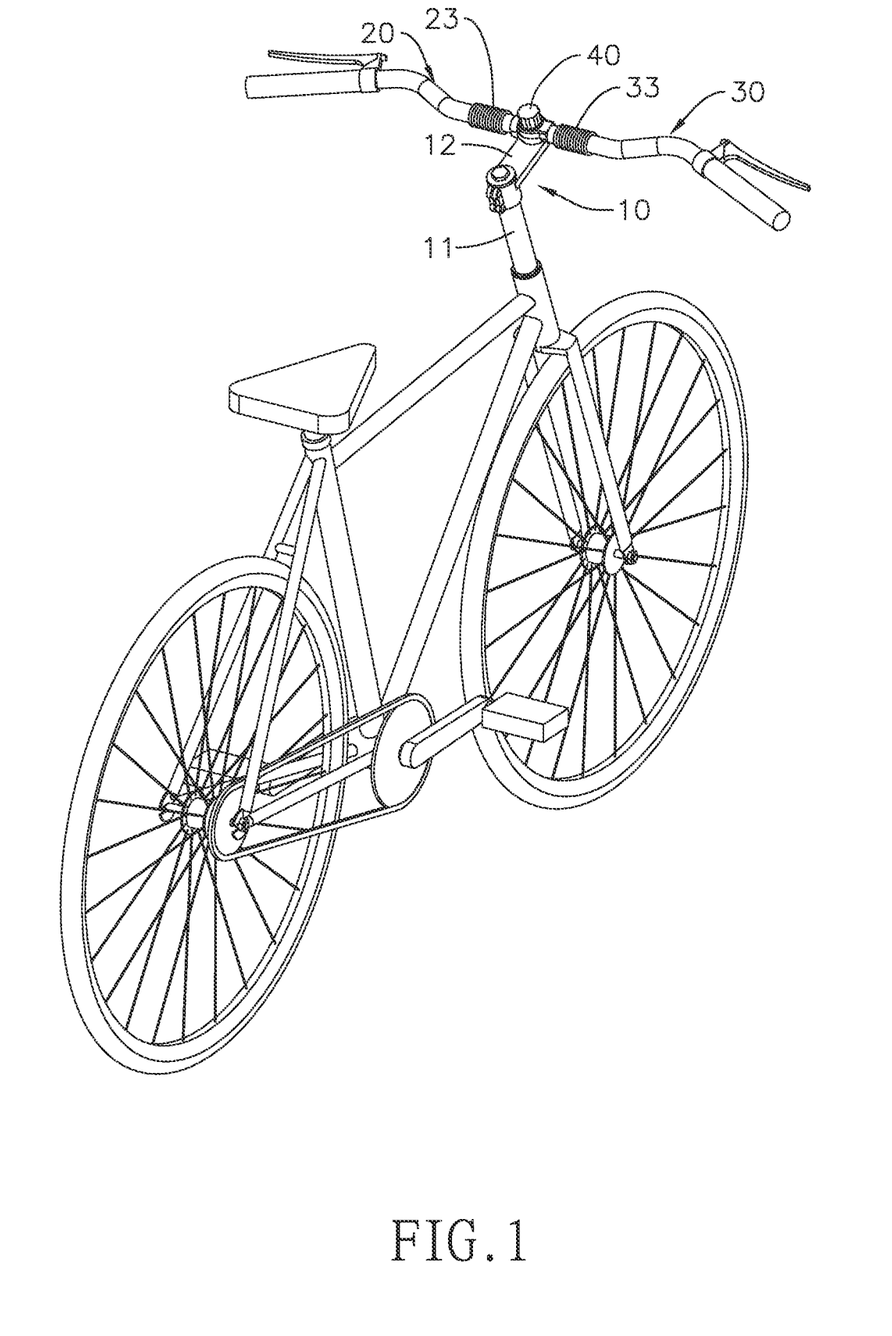
FIG. 1 is a perspective view of an embodiment of a vibration absorbing handlebar of a bicycle in accordance with the present invention assembled to a bicycle.
Figure 2:
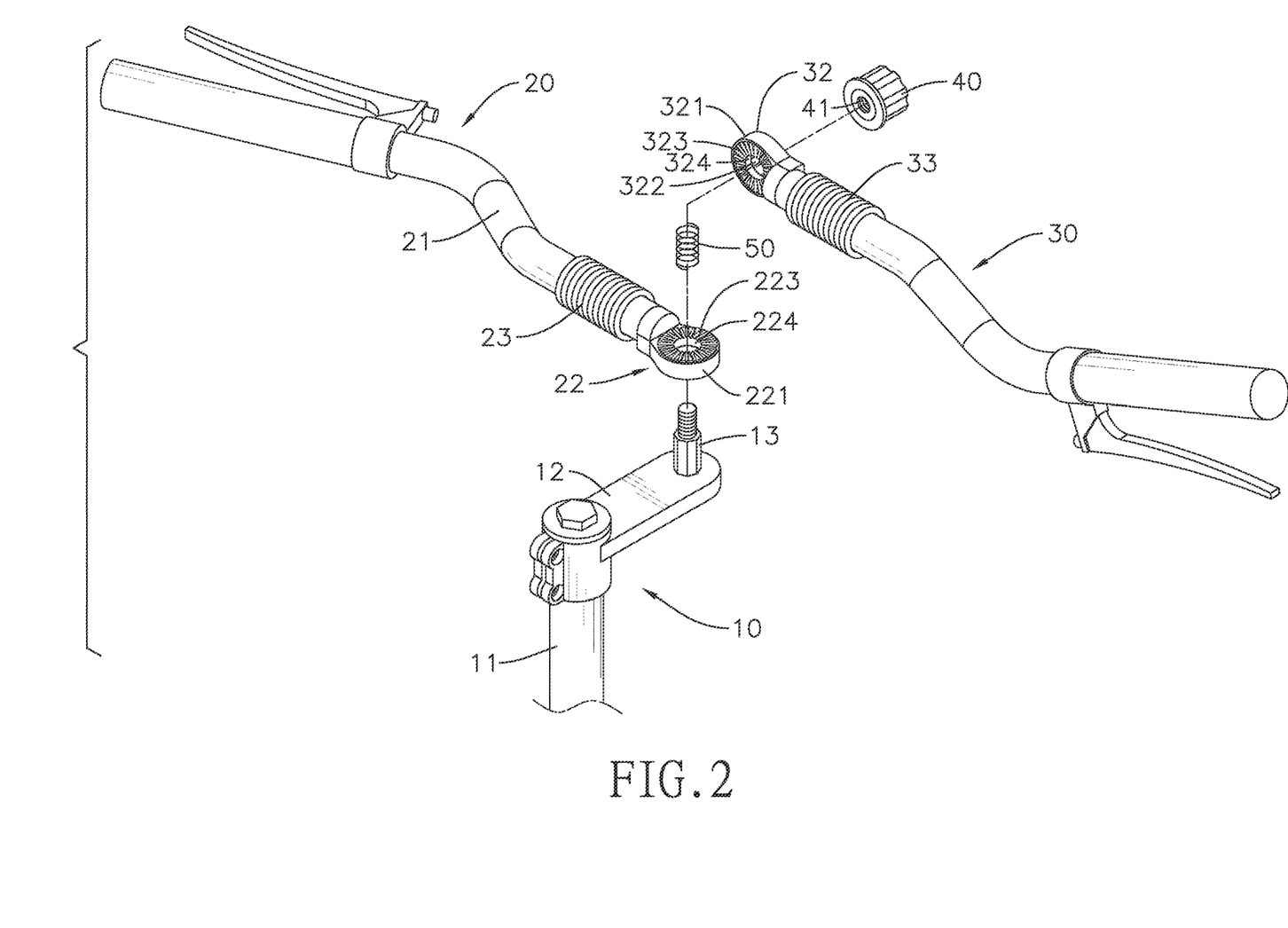
FIG. 2 is an exploded perspective view of the vibration absorbing handlebar in FIG. 1.

The steering module 10 has an axle 11 and a stem 12. The axle 11 is rotatable with respect to the frame, and one of two ends of the axle 11 is connected with a front wheel of the bicycle with a front fork. The stem 12 is connected to the other one of the two ends of the axle 11, and has an adjusting post 13 having two ends. One of the two ends of the adjusting post 13 is fixed to the stem 12 and forms a polygonal columnar portion, and the other one of the two ends of the adjusting post 13 has an outer thread. As shown in FIG. 2, the polygonal columnar portion of the adjusting post 13 is octagonal. The polygonal columnar portion may also be hexagonal, dodecagonal, or in other polygonal shapes.

Figure 3:
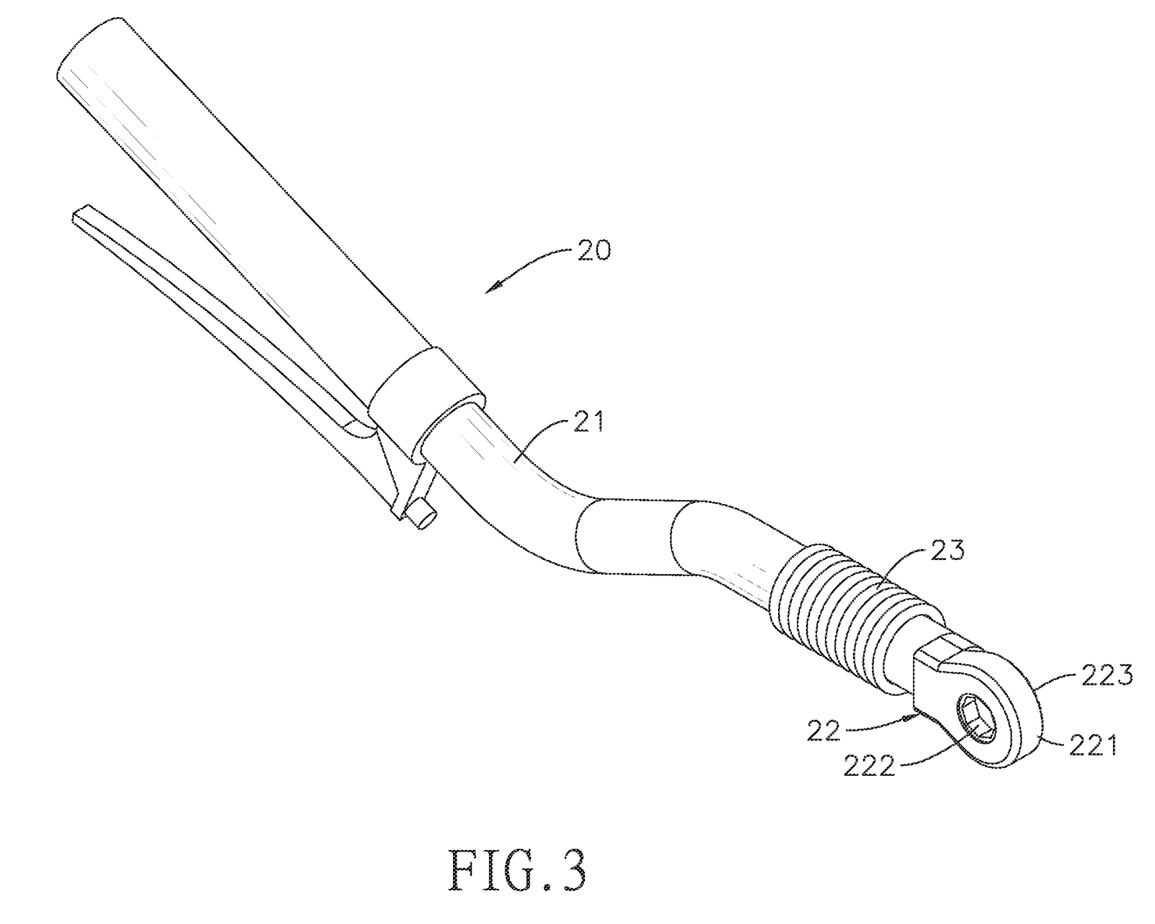
FIG. 3 is a perspective view of a left handle of the vibration absorbing handlebar in FIG. 1.

With reference to FIG. 3, the left handle 20 has a bar 21, a left adjusting socket 22, and a first elastic component 23. The bar 21 can be properly bended to form a specific shape upon demand. The left adjusting socket 22 has a post portion protruding from a side of the left adjusting socket 22. The first elastic component 23 is made of a hollow rod rolled up spirally and has multiple helical turns, and two adjacent said helical turns abut each other. One of two ends of the first elastic component 23 is connected with the bar 21, and the other one of the two ends of the first elastic component 23 is connected with the post portion of the left adjusting socket 22.

The left adjusting socket 22 comprises a socket body 221, a left adjusting hole 222, and a toothed portion 223. The left adjusting hole 222 is disposed through the socket body 221. The toothed portion 223 has multiple teeth protruding from an upper surface of the socket body 221 and surrounding the left adjusting hole 222. The left adjusting hole 222 is a polygonal hole. With reference to FIG. 2, in the present embodiment, the left adjusting hole 222, corresponding to the adjusting post 13, is an octagonal hole. The left adjusting hole 222 may also be hexagonal, dodecagonal, or in other polygonal shapes in accordance with the adjusting hole 13. Furthermore, the left adjusting socket 22 has a groove 224 recessed from the upper surface of the socket body 221, and the left adjusting hole 222 is disposed through a bottom of the groove 224 of the left adjusting socket 22.

The right handle 30 has basically the same structure with the left handle 20. The right handle 30 has a bar 31, a right adjusting socket 32, and a second elastic component 33. The right adjusting socket 32 has a post portion protruding from a side of the right adjusting socket 32. The second elastic component 33 is made of a hollow rod rolled up spirally and has multiple helical turns, and two adjacent said helical turns abut each other. One of two ends of the second elastic component 33 is connected with the bar 31, and the other one of the two ends of the second elastic component 33 is connected with the post portion of the right adjusting socket 32. Also, the right adjusting socket 32 comprises a socket body 321, a right adjusting hole 322, and a toothed portion 323. The right adjusting hole 322 is disposed through the socket body 321. The toothed portion 323 has multiple teeth protruding from a lower surface of the socket body 321 and surrounding the right adjusting hole 322. The right adjusting hole 322 is a polygonal hole, which is also identical with the left adjusting hole 222. The right adjusting hole 322 also corresponds to the adjusting post 13 and is octagonal. The right adjusting hole 322 may be hexagonal, dodecagonal, or in other polygonal shapes in accordance with the adjusting hole 13 as well. Furthermore, the right adjusting socket 32 has a groove 324 recessed from the lower surface of the socket body 321, and the right adjusting hole 322 is disposed through a bottom of the groove 324 of the right adjusting socket 32.

With reference to FIG. 2, the fixing knob 40 has a threaded hole 41 recessed or disposed through a center of the fixing knob 40. The threaded hole 41 is threaded with the outer thread of the adjusting post 13.

Figure 4:
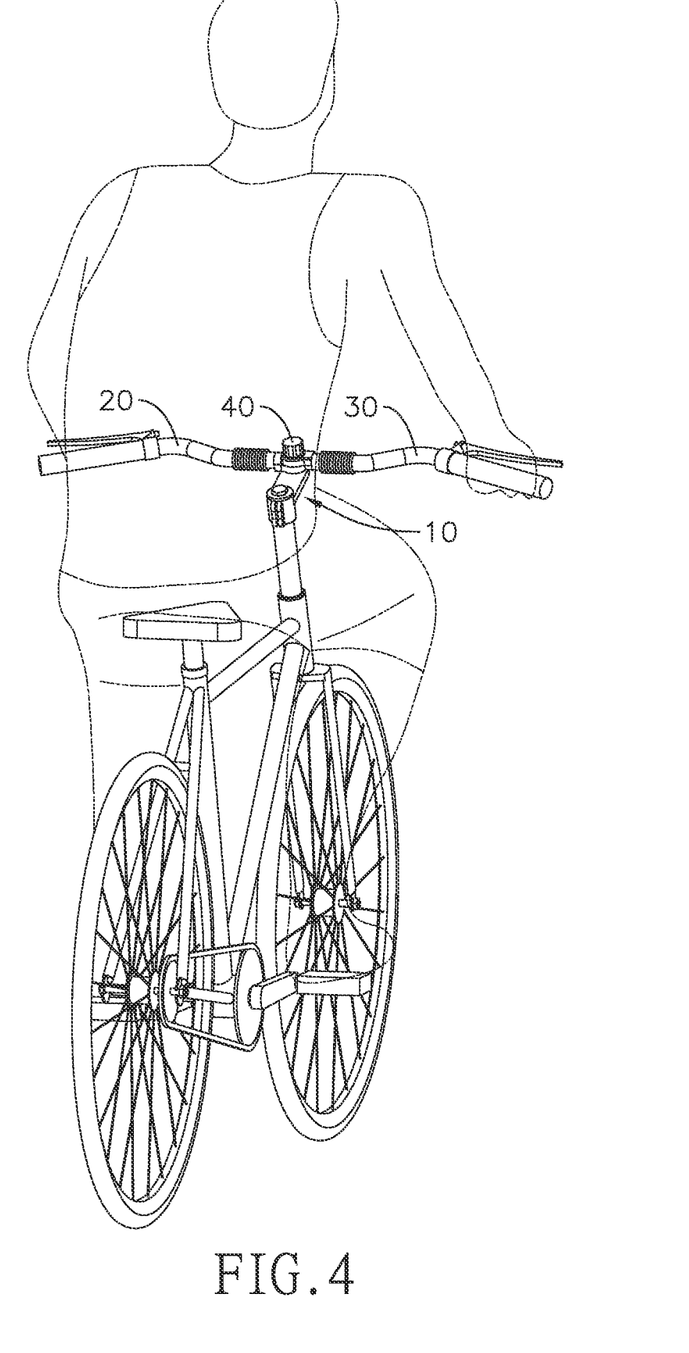
FIG. 4 is an operational view of the vibration absorbing handlebar in FIG. 1.

When being assembled, the left handle 20 is mounted to the stem 12 by the left adjusting hole 222 of the left adjusting socket 20 sheathed on the polygonal columnar portion of the adjusting post 13, and the right handle 30 is mounted to the stem 12 by the right adjusting hole 322 of the right adjusting socket 30 sheathed on the polygonal columnar portion of the adjusting post 13. Due to the left adjusting hole 222 and the right adjusting hole 322 both being polygonal, with reference to FIG. 5, a user may choose at which angles the left adjusting socket 20 and the right adjusting socket 30 are sheathed and positioned on the adjusting post 13. Afterwards, the threaded hole 41 of the fixing knob 40 is threaded with the outer thread of the adjusting post 13, making the left adjusting socket 22 and the right adjusting socket 32 abut against each other and form a specific angle with the stem 12 of the steering module 10. With reference to FIG. 4, the left handle 20 and the right handle 30 are diametrically aligned.

When the left adjusting socket 22 of the left handle 20 and the right adjusting socket 32 of the right handle 30 abut against each other, the teeth of the toothed portion 223 of the left handle 20 are engaged with the teeth of the toothed portion 323 of the right handle 30. Thereby, the left handle 20 and the right handle 30 can be maintained in certain shape and position.

With reference to FIG. 2, the vibration absorbing handlebar of the present invention further comprises an elastomer 50 located between the groove 224 of the left adjusting socket 22 and the groove 324 of the right adjusting socket 32 and sheathed on the adjusting post 13. Two ends of the elastomer 50 abut against the two grooves 224, 324, respectively. When the fixing knob 40 is mounted on the adjusting post 13 and the left adjusting socket 22 and the right adjusting socket 32 abut against each other, the elastomer 50 is compressed. Conversely, when the fixing knob 40 is loosened from the adjusting post 13, the elastomer 50 utilizes its restoring force to push away the right adjusting socket 32 and the left adjusting socket 22 for completely separating the teeth of the toothed portion 223 of the left handle 20 from the teeth of the toothed portion 323 of the right handle 30. Thereby, the user may conveniently operate adjustment.

Figure 5:
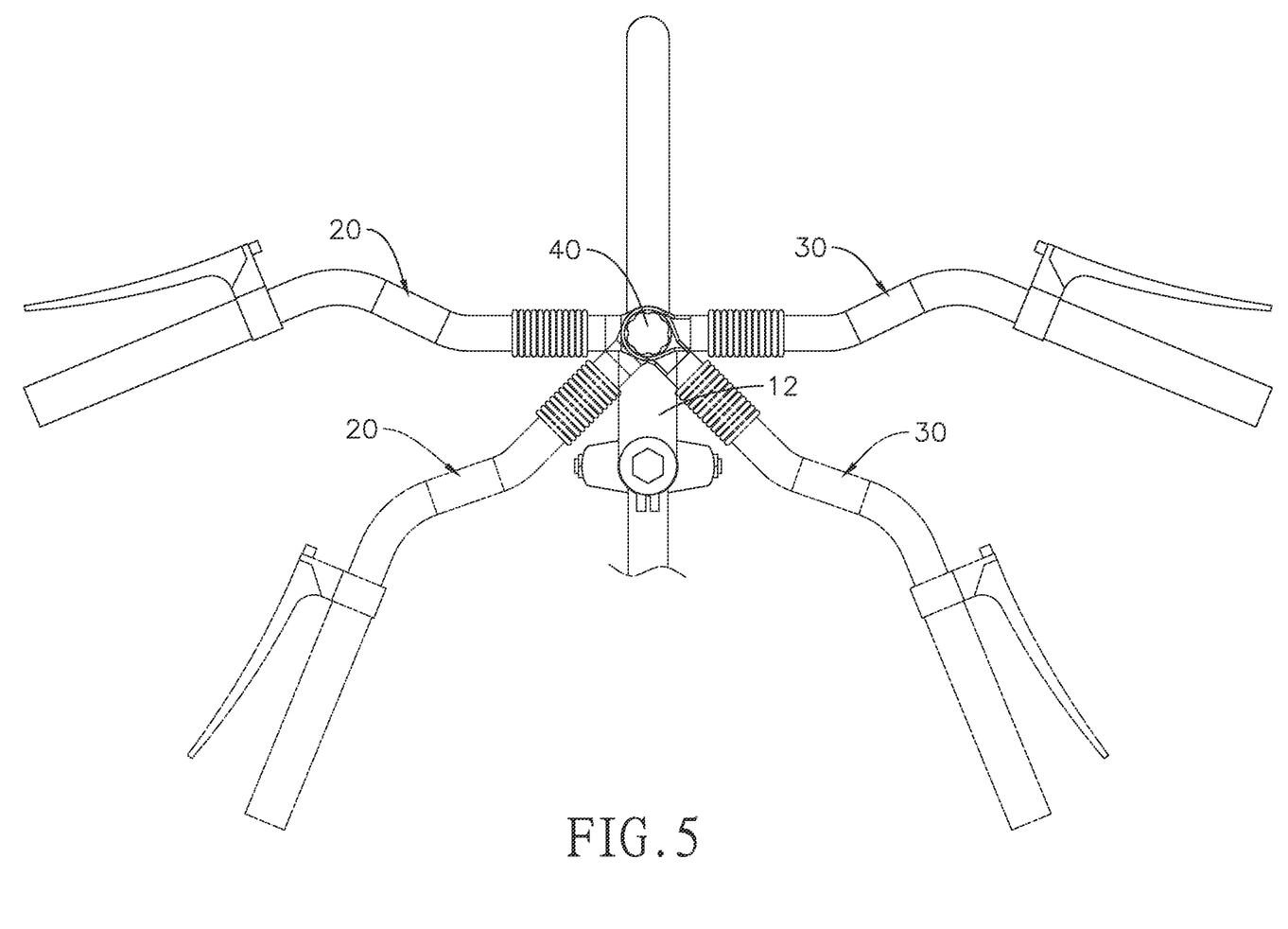
FIG. 5 is a top view of the vibration absorbing handlebar in FIG. 1, showing the left handle and a right handle adjusted at different angles.

With reference to FIG. 5, the left handle 20 and the right handle 30 can form an angle with respect to the frame according to the user's demand. As shown in FIG. 5, the angle of the left handle 20 and the right handle 30 is adjusted and positioned toward the user.

Figure 6:
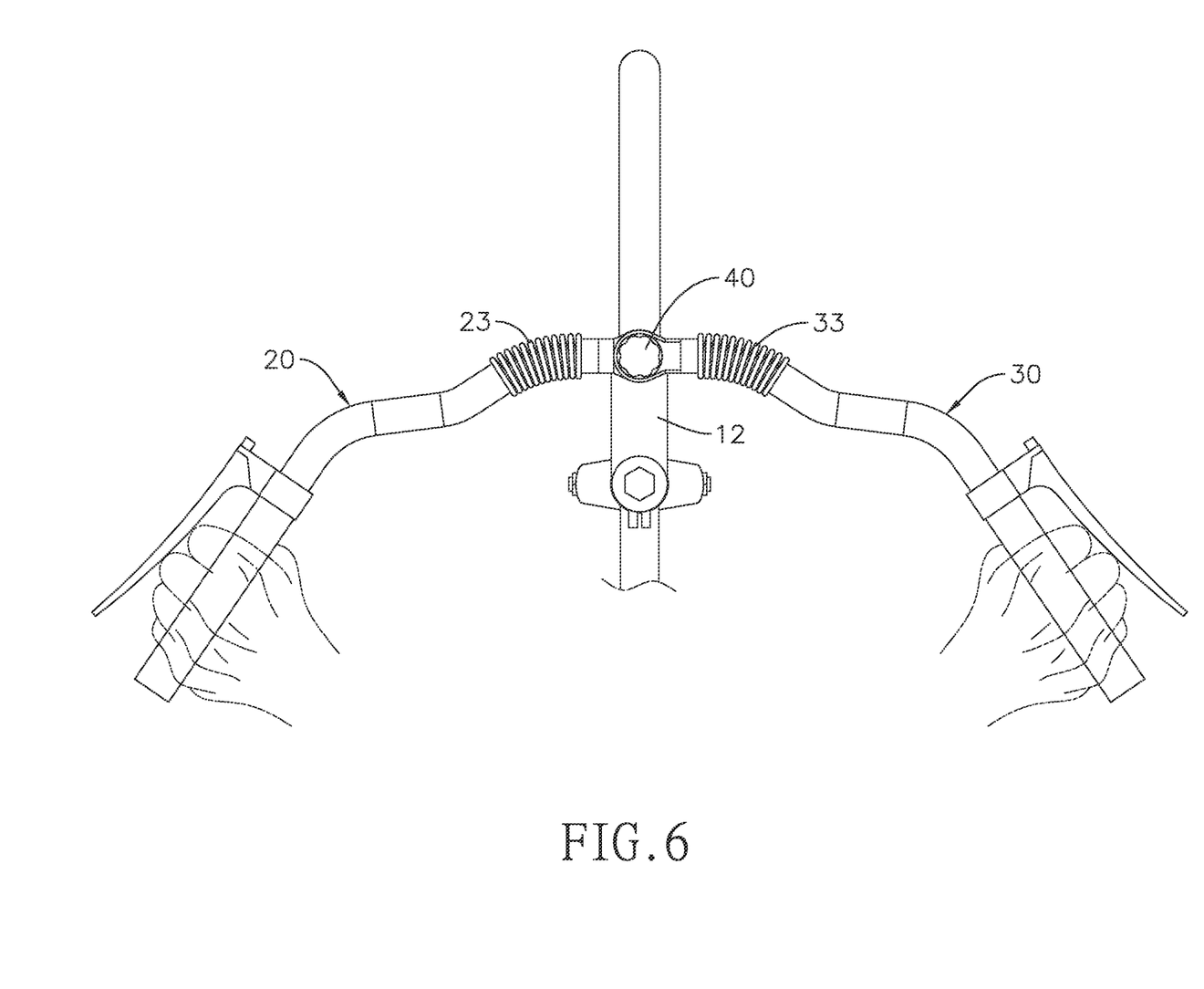
FIG. 6 is a top view of the vibration absorbing handlebar in FIG. 1, showing the left handle and the right handle providing bending movement.

With reference to FIG. 6, since the left handle 20 has said first elastic component 23 and the right handle 30 has said second elastic component 33, the user may hold the left handle 20 and the right handle 30 and force the first elastic component 23 and the second elastic component 33 to bend and deform with two hands under suitable timing and occasion, so as to reach efficacy of body training.

Figure 7:
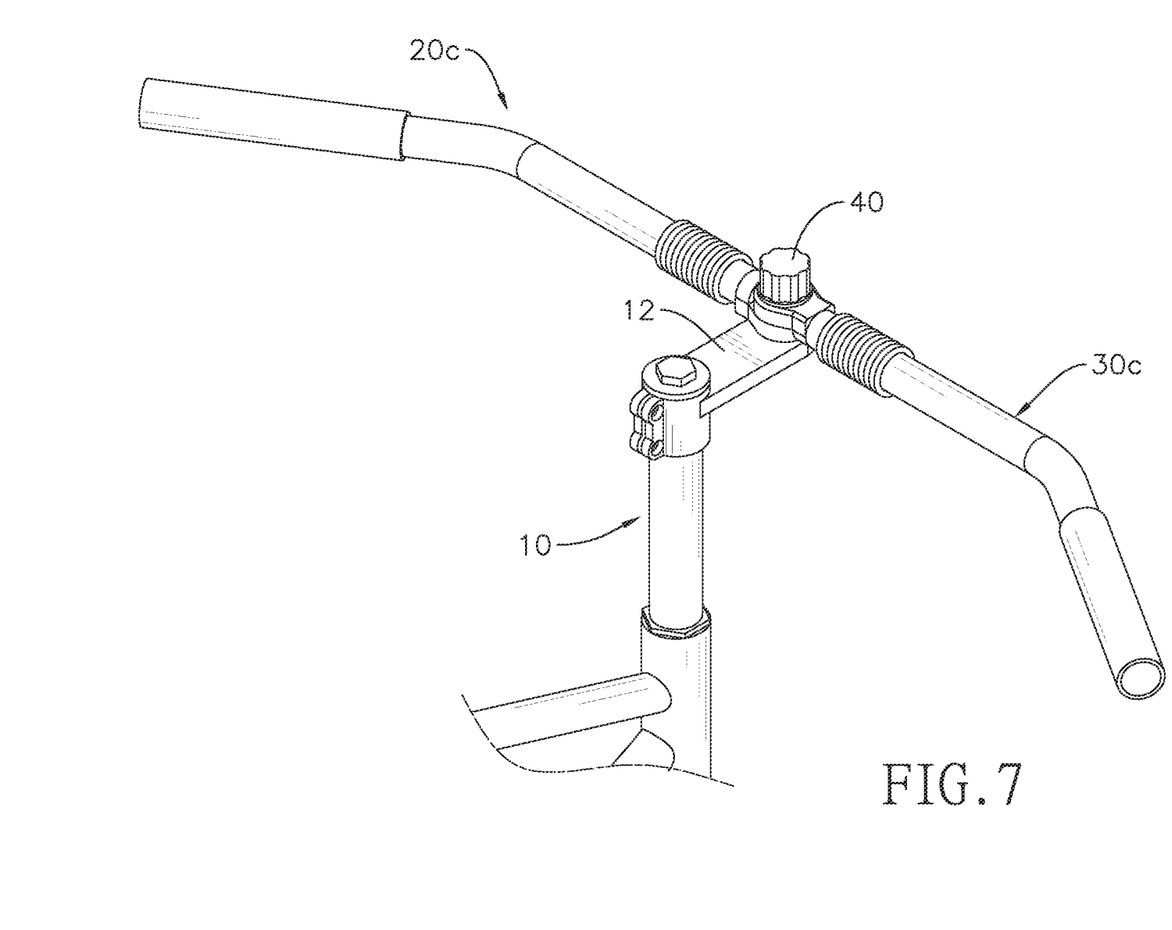
FIGS. 7 to 10 are perspective views of vibration absorbing handlebars in accordance with the present invention with handles thereof having different shapes.
Figure 8:
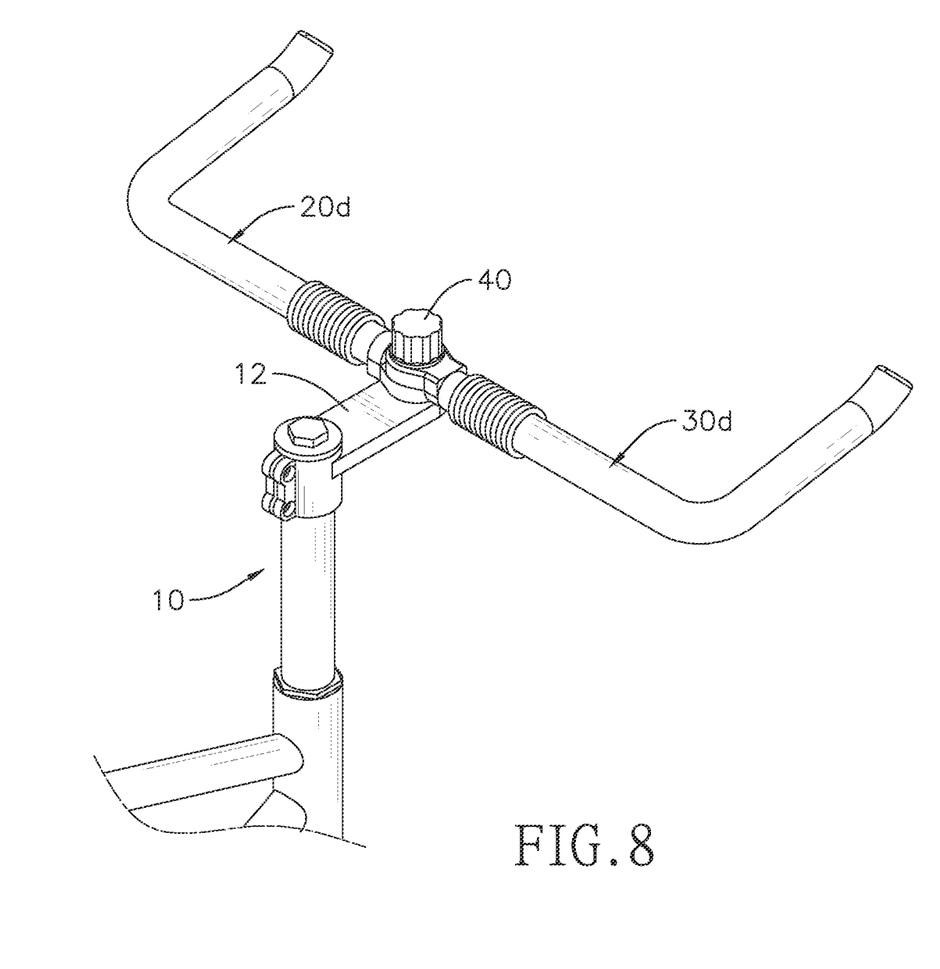
Figure 9:
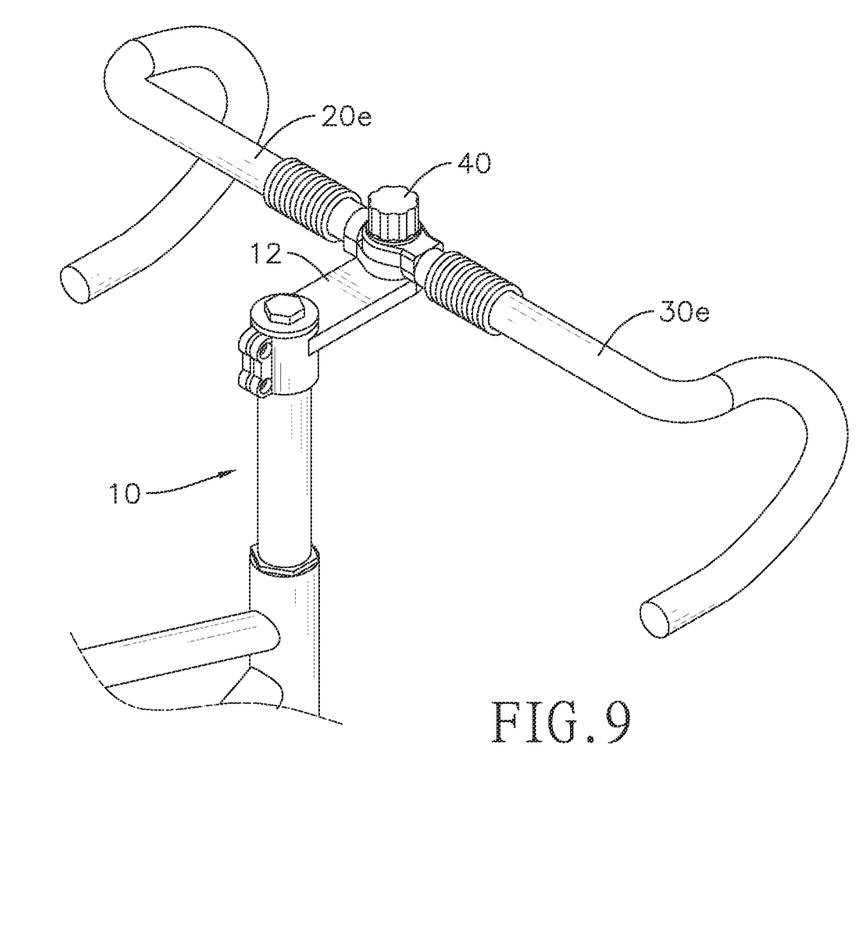
Figure 10:
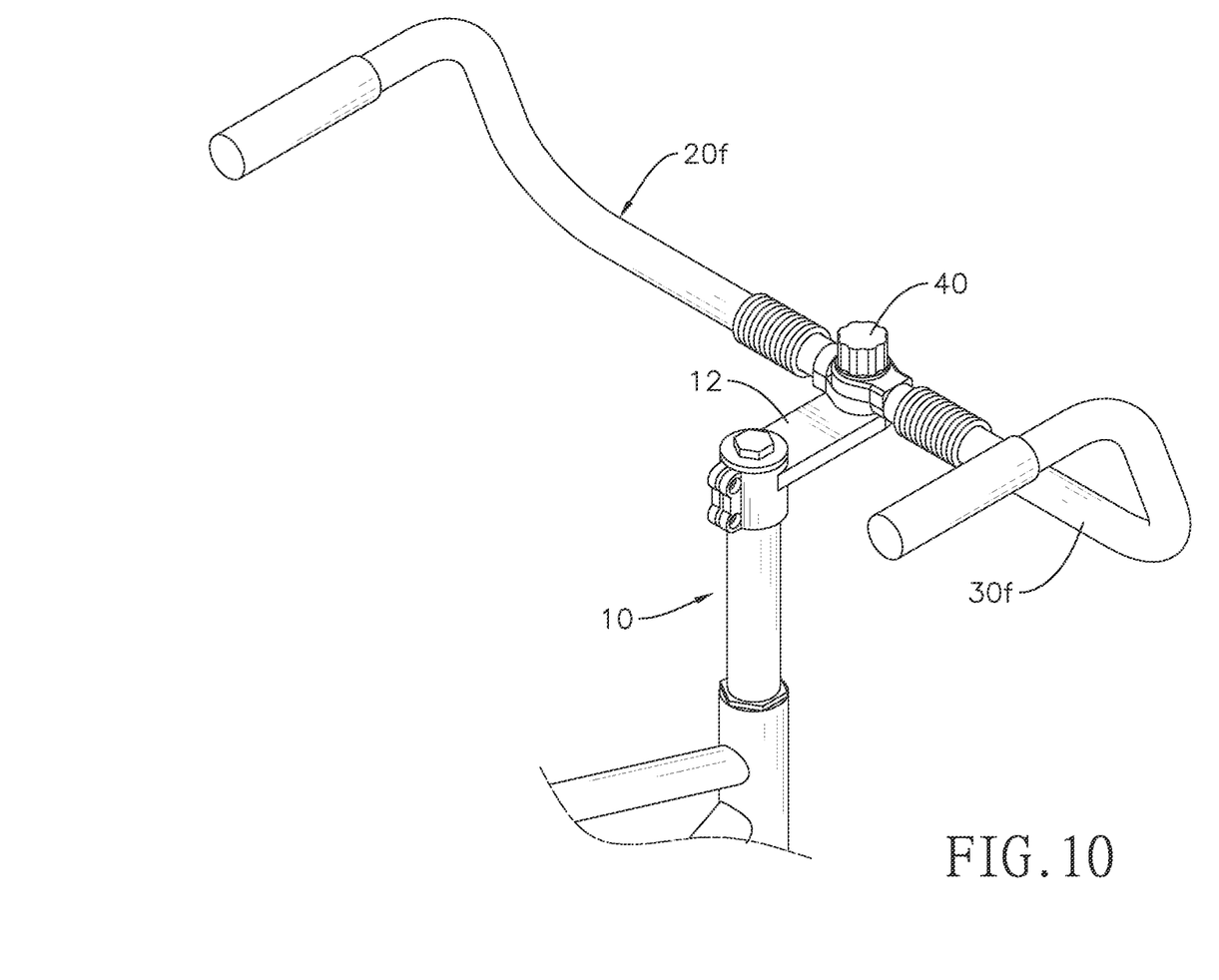

With reference to FIG. 7, the left handle 20c and the right handle 30c are assembled on the stem 12 of the steering module 10 with the fixing knob 40, wherein the left handle 20c and the right handle 30c extend outwardly and backwardly. With reference to FIG. 8, the left handle 20d and the right handle 30d are assembled on the stem 12 of the steering module 10 with the fixing knob 40, wherein the left handle 20d and the right handle 30d are forwardly bended and each form an angle of approximately 90 degrees. With reference to FIG. 11, the left handle 20e and the right handle 30e are assembled on the stem 12 of the steering module 10 with the fixing knob 40, wherein the left handle 20e and the right handle 30e extend downwardly and each form an arc. With reference to FIG. 10, the left handle 20f and the right handle 30f are assembled on the stem 12 of the steering module 10 with the fixing knob 40, wherein the left handle 20f and the right handle 30f are bended upwardly and then bended backwardly.

With the aforementioned technical characteristics, the vibration absorbing handlebar has the first elastic component 23 between the left handle 20, 20c, 20d, 20e, 20f and the stem 12, has the second elastic component 33, 33a between the right handle 30, 30c, 30d, 30e, 30f and the stem 12, so while the user is taking a ride, vibrations of the frame are absorbed by the first elastic component 23 and the second elastic component 33, 33a before transmitted to the left handle 20, 20c, 20d, 20e, 20f and the right handle 30, 30c, 30d, 30e, 30f. Therefore, improved comfort in riding is provided. Furthermore, the first elastic component 23 and the second elastic component 33 are configured to provide resistance. When stopped by traffic signals, the user may use the left handle 20, 20c, 20d, 20e, 20f and the right handle 30, 30c, 30d, 30e, 30f to exercise. Also, the left handle 20, 20c, 20d, 20e, 20f and the right handle 30, 30c, 30d, 30e, 30f may be assembled in aligned positions or at adjusted angles upon the user's demand, providing an advantage and effect of better flexibility in use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vibration absorbing handlebar of a bicycle, the vibration absorbing handlebar comprising:
a steering module having a stem;
a left handle comprising
 a bar; and
 a first elastic component having two ends;
wherein one of the two ends of the first elastic component is connected with an end of the bar, and the other one of the two ends of the first elastic component is connected with the stem;
a right handle comprising
 a bar; and
 a second elastic component having two ends;
wherein one of the two ends of the second elastic component is connected with an end of the bar, and the other one of the two ends of the second elastic component is connected with the stem;
an adjusting post having
 two ends, one of the two ends of the adjusting post fixed to the stem and forming a polygonal columnar portion, and the other one of the two ends of the adjusting post having an outer thread;
a left adjusting socket comprising
 a socket body;
 a left adjusting hole disposed through the socket body, being polygonal, and sheathed on and matching the polygonal columnar portion; and
 a toothed portion having multiple teeth which protrude from an upper surface of the socket body and surround the left adjusting hole; and
a right adjusting socket comprising
 a socket body;
 a right adjusting hole disposed through the socket body, being polygonal, and sheathed on and matching the polygonal columnar portion; and
 a toothed portion having multiple teeth which protrude from a lower surface of the socket body and surround the right adjusting hole; and
the right adjusting socket of the right handle abuts on the left adjusting socket of the left handle, and the toothed portion of the left handle engages with the toothed portion of the right handle.

2. The vibration absorbing handlebar as claimed in claim 1, wherein
the left adjusting socket has a groove recessed from the upper surface of the socket body;
the left adjusting hole is disposed through a bottom of the groove of the left adjusting socket;
the right adjusting socket has a groove recessed from the lower surface of the socket body;
the right adjusting hole is disposed through a bottom of the groove of the right adjusting socket; and
the vibration absorbing handlebar comprises
 an elastomer located between the groove of the left adjusting socket and the groove of the right adjusting socket and sheathed on the adjusting post; and
 a fixing knob having a threaded hole threaded with the outer thread of the adjusting post.

3. The vibration absorbing handlebar as claimed in claim 2, wherein each one of the left adjusting socket and the right adjusting socket has a post portion, the post portion of the left adjusting socket is connected with the first elastic component, and the post portion of the right adjusting socket is connected with the second elastic component.

4. The vibration absorbing handlebar as claimed in claim 3, wherein each one of the first elastic component and the second elastic component is made of a hollow rod rolled up spirally and has multiple helical turns, and two adjacent said helical turns abut each other.

5. The vibration absorbing handlebar as claimed in claim 2, wherein each one of the first elastic component and the second elastic component is made of a hollow rod rolled up spirally and has multiple helical turns, and two adjacent said helical turns abut each other.

6. The vibration absorbing handlebar as claimed in claim 1, wherein each one of the first elastic component and the second elastic component is made of a hollow rod rolled up spirally and has multiple helical turns, and two adjacent said helical turns abut each other.

* * * * *